United States Patent [19]

Colombani

[11] 4,209,353

[45] Jun. 24, 1980

[54] PROCESS AND APPARATUS FOR MAKING A COMBINATION BEAD WIRE AND BEAD ZONE FILLER FOR A VEHICLE TIRE

[75] Inventor: Bruno Colombani, Milan, Italy

[73] Assignee: Industrie Pirelli S.p.A., Milan, Italy

[21] Appl. No.: 893,392

[22] Filed: Apr. 4, 1978

[30] Foreign Application Priority Data

Apr. 13, 1977 [IT] Italy .............................. 22380 A/77

[51] Int. Cl.² ............................................. B29H 17/32
[52] U.S. Cl. .................................... 156/136; 156/401; 156/422
[58] Field of Search ............... 156/110 R, 123 R, 126, 156/131, 132, 135, 136, 394, 398-403, 422, 460

[56] References Cited

U.S. PATENT DOCUMENTS

| | | | |
|---|---|---|---|
| 3,784,426 | 1/1974 | Woodhall et al. | 156/132 |
| 3,787,263 | 1/1974 | Yonekawa et al. | 156/136 |
| 3,895,986 | 7/1975 | Komatsu | 156/131 |
| 3,909,338 | 9/1975 | Leblond et al. | 156/136 |
| 4,087,298 | 5/1978 | Mangun et al. | 156/136 |

*Primary Examiner*—John E. Kittle
*Attorney, Agent, or Firm*—Stevens, Davis, Miller & Mosher

[57] ABSTRACT

A process and apparatus are provided for making a bead wire and bead zone filler for a vehicle tire. The apparatus has a rotatable drum and deformable tubular member disposed on the drum. The external surface of the tubular member is adapted to receive a strip of elastomeric material to be shaped into the bead zone filler. The tubular member is changed from tubular to annular shape with a fluid under pressure.

6 Claims, 11 Drawing Figures

PROCESS AND APPARATUS FOR MAKING A COMBINATION BEAD WIRE AND BEAD ZONE FILLER FOR A VEHICLE TIRE

The present invention relates to a process for preparing an assembly of a bead-wire core and an annular filler for the bead zone of a vehicle tire with the filler being disposed in a radially outward position with respect to the bead core, and closely connected to the said core.

As already known, an annular filler material of a suitable composition is usually placed in the tire bead zone in a radially outward position with respect to the bead-wire core. The characteristics of the filler compound differ from those of the rubber compound of the sidewalls of the tire and of the beads of the tire. This annular element is found in a radially outer position with respect to the bead-wire core and it is firmly fixed to it in order to form a complex of the filler and the bead-wire core. The complex is inserted in the tire bead during the tire-building process. The material of the annular element is prepared from a compound of rather hard rubber which is different from the rubber of the tire sidewalls, the purpose being to fill up the zone outside the bead-wire core to avoid the formation of air blisters in the carcass cord-layer turn-ups around the core, as well as to impart a pre-fixed rigidity to the bead.

The above-said complex is usually prepared by a series of manual operations, and with the aid of simple equipment. The bead-wire core is mounted on a cylindrical seat of a turntable and, on an annular surface that is both contiguous and co-axial to the seat. A strip of elastomeric material suited for forming the filler is formed in a ring-shape and adhered to the core. In order that the edges of the strip adhere perfectly, and hence, in order to obtain an annular element having adhered edges, it is necessary to apply manually to the edges of the strip appropriate tractions capable of deforming suitably so as to bring them into contact, or else it is necessary to utilize a strip which is slightly longer than theoretically required and make appropriate cuts in the edges to define borders.

It is evident that with the above procedure and the said equipment, numerous manual operations are required for preparing the complex. Besides this, the complexes are assemblies that have characteristics that are dependent on the manual worker's skill.

Also known are machines able to prepare complexes of the type described, comprising a core seat, and a series of supporting elements, co-axial with the said core seat and capable of acting as a bearing for a strip of deformable material out of which is formed a semi-finished tubular shape. Means are also provided for causing the supporting elements to rotate to give to the semi-finished tubular shape a ring-shaped form and to turn up the same over the core bead.

By the process carried out with these machines, bead-core and filler element complexes are obtained but the filler has an irregularity in form and in dimension with respect to the desired theoretical one, that (just) gives rise to a state of non-uniform internal tensions that can cause either deformations or warping of the element during the subsequent phases of tire manufacture.

These drawbacks are due to the fact that during the transformation of the configuration of the semi-finished form from tubular to annular, raised and localized pressures are applied to it only in certain zones and the semi-finished form during the transformation is supported by discontinuous bearing surfaces. As a matter of fact, during the rotation of the supporting elements on which the semi-finished form rests, the distance is varied between them and as a consequence of this, the contact area between the semi-finished form and the supporting element vary as well, giving rise to the drawbacks mentioned before.

An object of this invention is to provide a procedure for preparing a bead-wire core and annular-filler element assembly which is devoid of any of the above-mentioned drawbacks, and also an apparatus capable of carrying out the process.

In accordance with the present invention, a process is provided for preparing a combination of a bead-wire core and an annular filler element for a vehicle tire bead zone with the filler disposed in a radially external position with respect to the bead-wire core and closely connected to the latter, characterized by the fact that it comprises the steps of applying a bead-wire core on a substantially cylindrical seat, arranging a strip of elastomeric material capable of becoming the said annular filler element on the external surface of a deformable element resting on a supporting substantially cylindrical surface in such a way as to obtain a semi-finished form that is substantially tubular, said supporting surface being co-axial to the said bead-wire core seat and immediately contiguous to it, of feeding a fluid under pressure between the said supporting surface and said deformable element in such a way as to exercise over the said semi-finished form, by means of the said deformable element, in a continuous manner and on the entire surface of it pressures for modifying the said form form from tubular to annular, turning it up over the bead-wire core and widening it, in an increasing measure, beginning with its extremity that lies in the proximity of the bead-wire core towards the opposite end.

This invention also provides an apparatus for the preparation of an assembly of a bead-wire core with an annular filler element for the bead zone of a vehicle tire, the filler being disposed in a radially external position with respect to the bead-wire core and fixed to the latter. This apparatus comprises a supporting drum that is substantially cylindrical, and is actuated by a motor, and a tubular deformable element capable of leaning on the said drum and provided with an annular edge connected to a side of the drum, the external surface of the said deformable element being able to receive a strip of elastomeric material for obtaining a semi-finished form that is substantially tubular, a substantially cylindrical seat for the said bead-wire core disposed in the immediate proximity of the said drum side, co-axial and fast with it, fluid under pressure means for deforming said deformable element and for detaching it from the said drum by enlarging it in an increasing measure, starting from the side in which the said edge of the deformable element is fixed to the drum towards the side opposite, in such a way as to modify the form of the said semi-finished form from tubular to annular, turning it over the bead-wire core and deforming it in an increasing way, beginning from the end that is in proximity of the bead-wire core towards the side facing.

The procedure and the apparatus of the present invention will now be described in detail with reference to the attached drawings wherein.

Before describing the novel process, a preferred embodiment for practicing the process of the invention will be described first.

The framework of the apparatus comprises a foundation 1, a pair of vertical support members 2 and a cross-member 3 fixed at the upper end of the vertical members 2.

Figure 3:
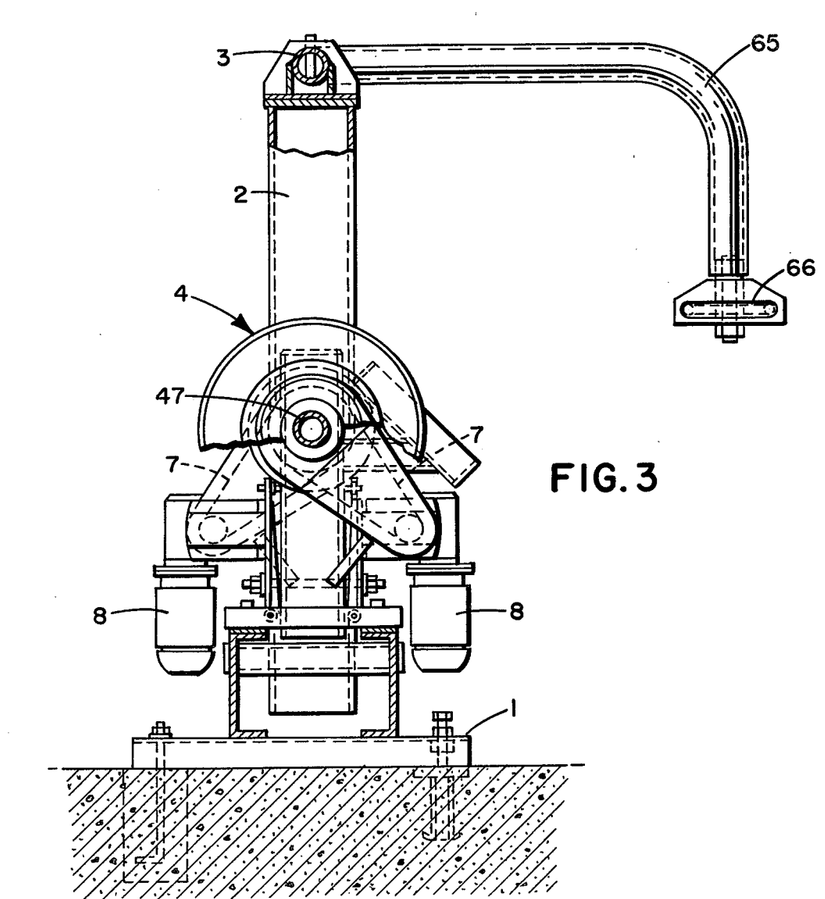
FIG. 3 is a section of the apparatus taken along the line 3—3 of FIG. 2.
Figure 5:
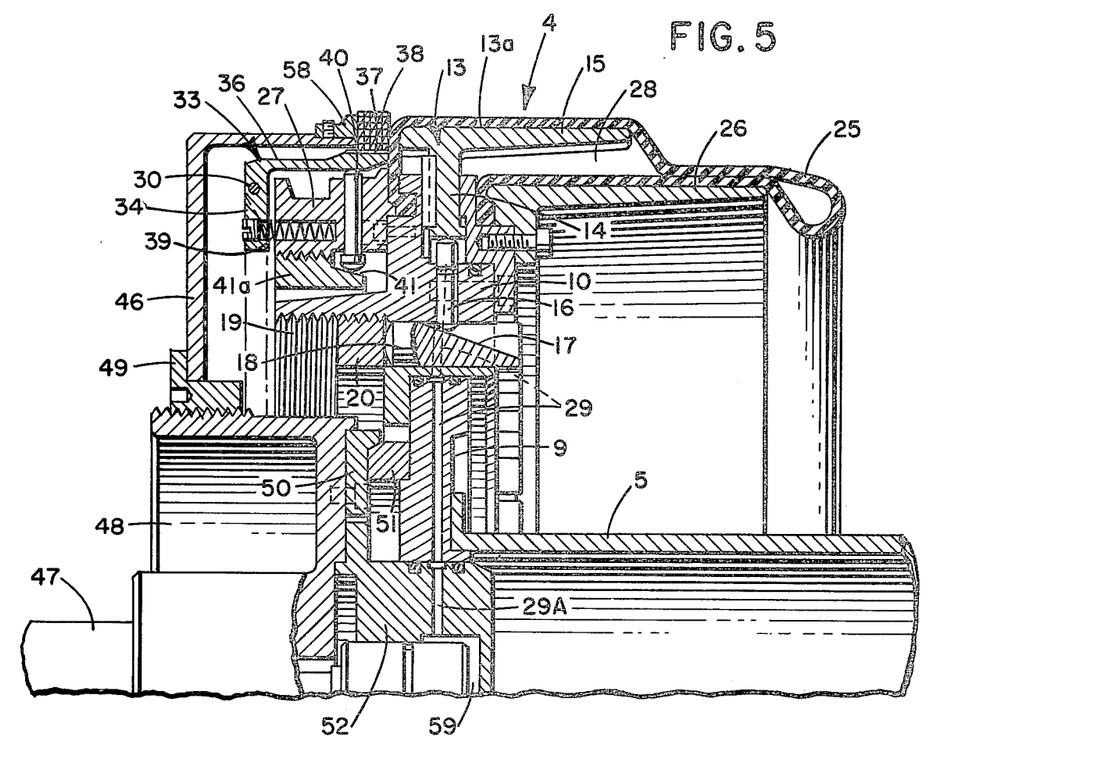
FIG. 5 is a longitudinal section of the drum and the bell with which the apparatus is provided.

On the framework are two rotating winding drums 4, such as those represented in section in FIG. 5. Each drum comprises a rotating shaft 5 (FIGS. 1 and 5) supported in cantilever fashion by a central support 6 (FIG. 1) forming part of the framework of the apparatus. Each shaft 5 is put into rotation by an electrical motor 8, connected with said shafts by means of appropriate transmission means, comprising for example belt 7 (FIG. 3).

Each drum comprises a disc 9 (FIG. 5) fixed to the shaft 5 made fast with an annular supporting element 10. On the latter there are radially mobile the sectors 13, each of which comprise:

a shank 14, lodged in a corresponding annular hollow of the annular supporting element 10, and capable of shifting radially inside it, and a sustaining part 15 delimited externally by a cylindrical surface 13a. The radial position of each sector 13 is controlled by stem 16, that is mobile in the radial direction in a hole of the supporting annular element 10, and the extremities of which contact, one on the extremity of the shank 14 part of the sector, and the other on an inclined surface 17 of another stem 18, mobile in a hole of the above-said element in the direction that is substantially orthogonal to the one preceding.

Inside a female thread 19 of the supporting annular element 10 there is screwed a male threaded nut 20, that is in contact on one extremity of the shafts 18, in such a way that, by varying the axial position of the nut itself, with respect to the annular supporting element 10 (a variation that is obtained by either screwing or unscrewing the nut inside its relative female thread) the shafts 18 are axially shifted, determining in their turn a shifting radially of the shafts 16 and hence, also the sectors 13.

Figure 6:
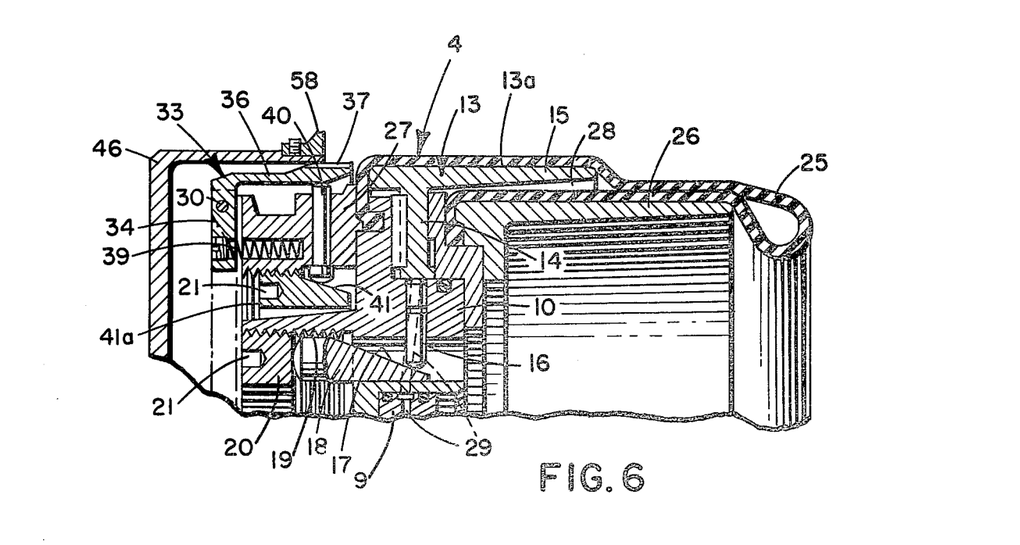
FIG. 6 is a similar section to that of FIG. 5 wherein the various parts are found in a configuration that is different from that of FIG. 5.

In the FIGS. 5 and 6 there have been represented two diverse radial configurations of the sectors 13, to which, obviously, correspond diverse positions of the shafts 16 and 18 and of the nut 20. The rotation of the latter is conveniently obtained by inserting a suitable wrench into its axial holes 21 (FIG. 6).

An air bag 25 made fast with the drum 4, is disposed on the surfaces 13a of the sectors 13 and on the surface of an annular flange 26, fixed to the annular supporting element 10, as is clearly represented in FIGS. 5 and 6; the annular edges of this air bag are fixed, one between said element and the said flanges, and the other between the former and another annular supporting element 27, fast with the one preceding, in such a way as to define (inside the said air bag) an air-tight cavity 28 that communicates through appropriate conduits 29, with a reservoir of fluid under pressure. Conveniently, this air bag comprises fabric cords the threads of which are disposed substantially in diametrical planes of the air bag itself (placed radially).

Figure 7:
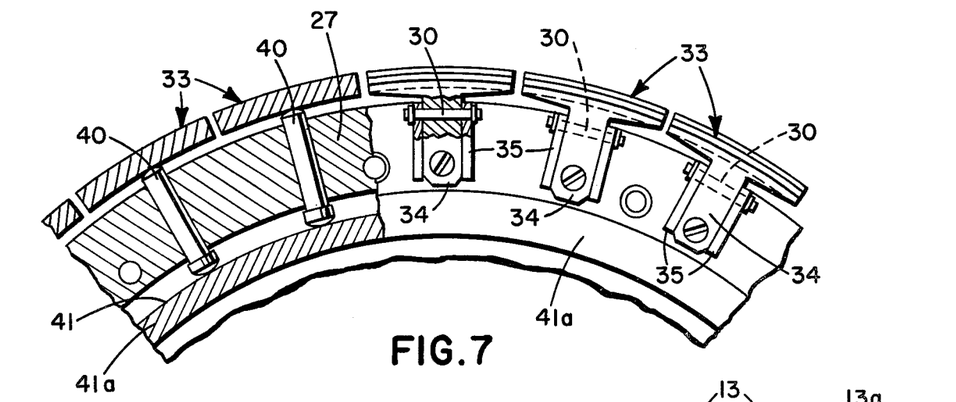
FIGS. 7 and 8 represent details, partly cut away, of the drum of FIG. 5.

On the annular supporting element 27 there are hinged, by means of pivots 30 (FIGS. 5 and 7) members 33; each one of these presenting a shank part 34, hinged to two fins 35 (FIG. 7) of the said element, and a supporting part 36, externally defined by a substantially cylindrical surface 37, capable of constituting the seats for a core 38. On the side of the shank 34 of each of the members 33 a helicoidal spring 39 acts, pulling each member 33 (FIG. 5) into a clockwise rotation.

The angular position of this is controlled by a shaft 40, radially mobile in a hole of the annular supporting element 27, the ends, of said shaft contacting one on the part 36 of member 33, and the other on a conical surface 41 of a male threaded nut 41a axially mobile in a corresponding threaded hole 42 (FIG. 6) of the very element itself. Varying the axial position of this nut, with respect to the annular supporting element 27 the radial shifting of the shafts 40 is obviously determined, and hence, the rotation of the members 33 around the relative pivots 30.

In FIGS. 5 and 6 there have been shown two different angular configurations of the members 33, to which obviously correspond different positions of the shaft stems 40 and the nut 41a; the rotation of this is conveniently obtained by inserting a suitable wrench into its axial holes 21 (FIG. 6).

According to a different embodiment, not illustrated, the annular element of the support 27, instead of being provided with the previously described members 33, can be provided with simple radial fins inserted into the above-said element and projecting in cantilever fashion from it, in such a way as to define with its radially outermost surface a substantially cylindrical seat for the bead 38, the said fins can be elastically deformable in the radial direction in order to enable their correct twinning with the core.

It is evident that this invention provides an apparatus, the drum of which, instead of being provided with sectors 13 and members 33, the radial position of which can be adjusted as desired, simply have a cylindrical seat 13a, having a prefixed and invariable diameter for supporting the air bag 25 and a cylindrical seat 37, also this having a prefixed and invariable diameter for supporting the bead 38.

Figure 1:
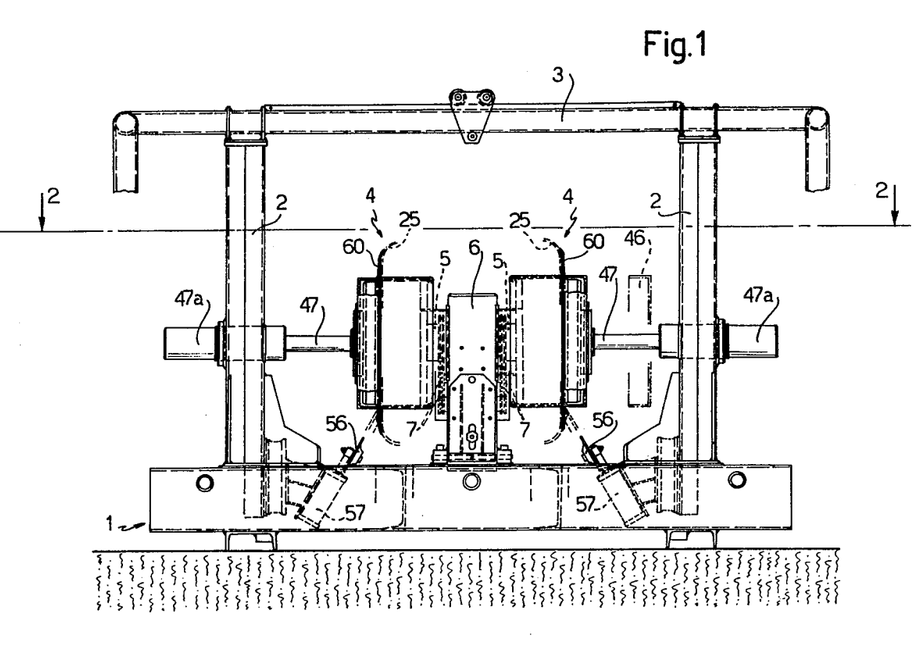
FIGS. 1 and 2 are, respectively, a part elevation and a sectional view taken along line 2—2 of FIG. 1 of one embodiment of the apparatus of the invention.

A bell 46 (FIG. 5) forms part of each drum 4. Said bell is rotatable and axially mobile with respect to the other parts of the drum just mentioned; and is supported by a shaft 47 (FIGS. 1 and 5) that is rotatable and axially shiftable, for example due to the action of a fluid-dynamic cylinder 47a (FIG. 1).

The bell 46 is carried by a crown 48 fast with the above-said shaft and between the two there is placed a threaded bush 49 screwed to a corresponding threaded groove in the crown. Hence, by rotating the said bush, it is possible to vary the axial position of the bell 46 with respect to the above-said crown.

The centering of the shaft 47 with respect to the shaft 5, and hence of the bell 46 with respect to the other parts of drum 4, is obtained by means of a pair of rings 50, 51 provided with control surfaces pre-disposed for being coupled and made solid, the former with the crown 48, and the latter with the disc 9.

At the crown 48 there is also a cylindrical body 52 made fast with, adapted to be inserted into a corresponding hole of disc 9 in order to put into hydraulic contact the conductors 29 with which it is provided, with the corresponding conduits 29 of the above-said disc as is clearly shown in FIG. 5.

Figure 4:
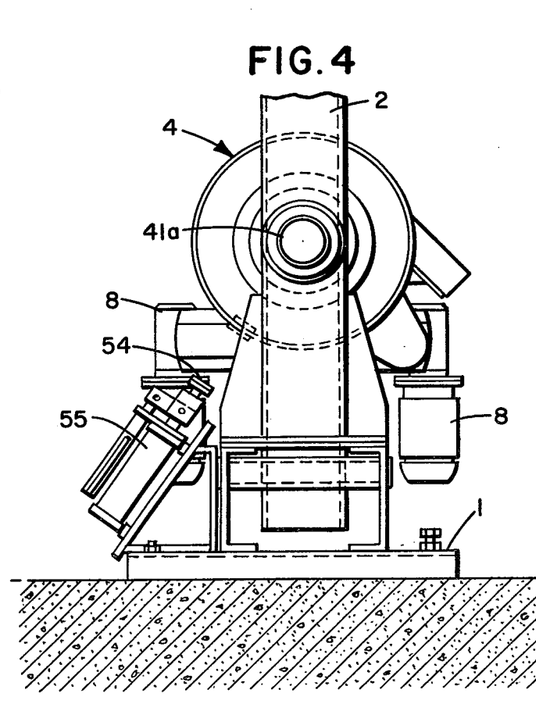
FIG. 4 is a fragmenting rear view of the apparatus.

The apparatus of the invention comprises, besides this, a pair of pressure platens 54 (FIG. 4) each one of which is capable of being brought into contact with the joining zone of the strip of material that is placed on the external surface of the air bag 25 bearing on the surface 13a of the sectors 13, for exercising on it a pre-fixed pressure. Each one of these platens is made solid with the stem of a fluid-dynamic cylinder 55 fixed to the machine frame. A turntable stitching disc 56 (FIG. 1) is supported by the extremity of a fluid-dynamic cylinder stem 57, said cylinder being also fast with the machine frame, and placed in such a way as to move said disc from an at-rest position, represented with dash line in FIG. 1, to a working position (represented with a broken line in the same figure) in which each disc 56 is in contact with the filler element that must be connected to the bead-wire core.

The process of the invention takes place in the following way, by utilizing the described apparatus.

At the beginning of the working cycle, each bell 46 is separated from the remaining part of the relative drum 4, and it is found in the position represented by a broken line at the right of FIG. 1. A core 38 (FIG. 5), prepared with the usual modality having for example a rectangular section, is placed on the external surface having a smaller diameter of the members 33.

Figure 9:
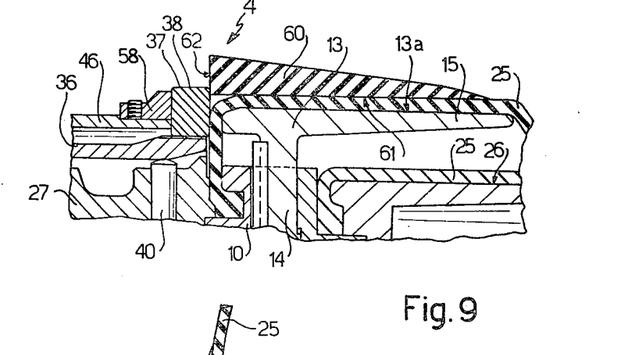
FIGS. 9 and 10 represent diagrammatical sections of part of the above-said drum and bell during two phases of the process.

Successively the cylindrical fluid-dynamic cylinder 47a is activated for controlling the shifting of the bell 46, in such a way as to draw it close to the remaining part of the drum 4; during this shifting, the annular border of this bell goes to lean on the bead 38, shifting it in the same direction until it reaches the position of FIGS. 5 and 9 wherein it is centered on the surfaces 37 of the members 33 and it is in contact with the bag 25. Obviously, before initiating the process, the angular position of the members 33 is regulated in such a way as to define with its external surface 37 a supporting seat for the core 38 having a substantially equal diameter to that of inside the core itself.

On the bell 46 there is also mounted a ring 58, the form of which depends on the form of the core section 38 and it is such as to realize a correct support between the former and the latter during the "push" action of the core, and above all during the (b) locking phase. The regulation of the angular position of the members 33 is carried out, as said already, by causing the nut 41a to rotate. The regulating of the correct axial position of the bell 46 with respect to the other part of the drum 4, depending upon the core section 38, is obtained by causing the bush 49 to rotate with respect to the crown 48.

Before initiating the process, the radial position of the sectors 13 of each drum 4 is also regulated, by acting, as said, on the threaded nut 20. This regulating is done so as to dispose the external surface of that part of the air bag 25 that leans on the surface 13a of the sectors themselves, on a cylindrical surface having a diameter of a little less than that of outside the core, as has been represented in FIGS. 5 and 9.

At the end of the said axial shifting of the bell 46, which is necessary for taking the core 38 onto the surfaces 37 of the members 33, the bell 46 is perfectly centered with respect to the other part of the drum 4, because of the coupling between the conical surfaces of the rings 50 and 51.

Besides this, the cylindrical body 52 is inserted in the hole of disc 9, putting into hydraulic communication (through the conduits 29) the cavity 28 inside the air bag 25, with the cavity 59 (FIG. 5) of the said body, which is, in its turn in communication with an appropriate reservoir of fluid under pressure.

An operator, assigned to the machine, lays down on the external surface of the air bag 25 a strip of material 60 (FIG. 9) out to a pre-fixed measure, and able to originate a filling element. The above-said strip can opportunely have the section represented in FIG. 9, substantially triangular. In which case the surface 61 of the strip is made to rest on the external surface of the air bag 25, while a part of the surface 62 of the strip itself is brought into contact with the core 38 the material of this strip being normally constituted by a compound of raw rubber there is a good adherence between this and the core 38, while it is endeavoured to have no adherence between the air bag and the strip.

At this point the electric motor 8 is activated for controlling the rotation of shaft 5, and during the rotation of drum 4 the strip 60 is, because of its adherence with core 38, pulled by the rotation to give origin to a real and proper semi-finished tubular form. The rotation is stopped when the strip has been wound completely around the drum. In such a configuration its end boundaries tally perfectly, and on them the operator exercises a modest pressure for causing them to adhere lightly. Then the joint is carried (by the drum rotation) into correspondence with the plates 54 that exercise on its borders a pre-fixed pressure, obtained following the actioning of a fluid dynamic cylinder 55.

Figure 10:
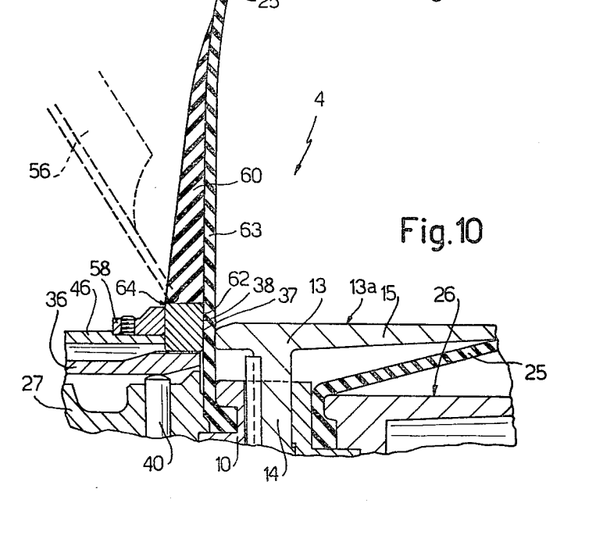

At this point compressed fluid is fed into the cavity 28 of the air bag 25 through the conduits 29. As a result of the air pressure the bag is inflated and assumes a thoric configuration. The sidewall 63 (FIG. 10) of the said bag gradually rises until it lies in a substantially radial position, as is shown in FIG. 10 determining, as a consequence, the rotation of the semi-finished form 60, substantially around the axially outer and radially inner corner (circle intersection of the surfaces 61 and 62) until placing it in an annular configuration, radially external with respect of the core 38 and in strict contact with it.

In the equilibrium configuration, the inflated bag profile 25 obtained by sectioning the bag on a diametrical plane is, in the absence of the semi-finished form 60, substantially a circumference (in reality the restraint created by the sectors 13 prevent this condition from rigorously being realized). If, on the other hand, on the sidewall 63 (FIG. 10) of the said bag, the semi-finished form 60 leans, the said theoretical configuration cannot be rigorously realized, owing to the pressures that the semi-finished form itself exercises upon the said sidewall. It is evident, however, that the higher the pressure of the fluid is within the air bag, the higher is the force exercised on the side-wall 63 on the semi-finished form 60, and hence, the chamber configuration of the bag itself is closer to the theoretical one, with the position assumed by the sidewall 63 being the equilibrium position between the actions in the opposite sense, applied to it by the semi-finished form 60 and by the fluid pressure.

It is easy to understand how the reaction, exercised by the semi-finished form 60, sensibly increases, starting from the moment when the surface 62 comes into contact with the radially external core surface, due to the compression that the semi-finished form 60 is subjected to between the core and bag side-wall.

If one admits now that the internal pressure of bag 25 is sufficient for turning up the semi-finished form 60 onto the bead but not for overcoming the thrust exerted by the core on the semi-finished form, one can understand that the final configuration, according to which the semi-finished form is disposed with respect to the core depends upon, and can be rigorously controlled by the inclination of the surface 62 with respect to the semi-finished form itself.

The fluid pressure inside the bag 25 can be controlled by putting into hydraulic communication the inside of the bag itself, with a rigid tank filled previously with a fluid under a pre-fixed pressure.

Naturally, the pressure exercised by the bag on the semi-finished form is not so sufficient as to guarantee in any case the complete adhesion between the semi-finished form and the core.

At this point the fluid-dynamic cylinder 57 is activated for taking the relative rotating disc 56 into contact with the filler element, in such a way as to exercise over it, and in the immediate proximity of the corner 64 (FIG. 10) pressures that are adequate for improving the adhesion between the element and core; during this operation the drum 4 is made to rotate.

Now, by carrying out, in an opposite sense, some of the described phases it is possible to free the core-filler complex from the apparatus and take the apparatus back to the starting cycle point.

Figure 2:
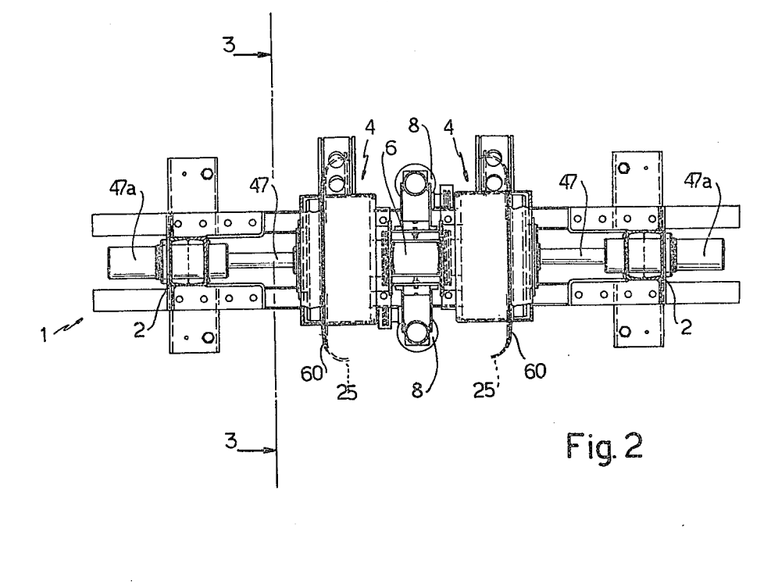

From what is visible in FIGS. 1 and 2, the apparatus is provided with a pair of co-axial drums 4, so as to increase productivity, realizable whenever a manual operation is carried out on one drum, while on the other drum the process is carried out without manual intervention, with one of the phases described.

For convenience sake, the apparatus may be provided with auxiliary equipment for facilitating the carrying out of some of the phases described. Arms 65 can be, for example, predisposed fast with a bar 3, to each of which is connected a frame 66 suitable for acting as a support for the cores that must be loaded onto the apparatus or for the core filling element complexes discharged from it.

The complex core-filler obtained with the process and the apparatus described, presents numerous favourable properties.

The real and proper filling element 60, presents always the form and dimensions exactly corresponding to those theoretical, that are desired to be obtained; in particular it has the same form in any equatorial section. Besides this, there is also a uniform distribution of tensions inside the filling element, with the consequence of avoiding dangerous concentrations of tensions that could originate deformations or warping in the successive phase of work in the tire. Finally, the mechanical connection between the filling element and the core is completely satisfactory. These favorable characteristics are obtained, both because it is possible to position in an extremely rigorous way the semi-finished tubular form 60 (FIG. 9) that will give origin to the filling element in a first position with respect to the core (the position relative to FIG. 9) as well, because it is possible to control exactly the deformation of said semi-finished form, when it is turned up over the core, both, above all, since this phase is obtained by exercising pressures that are substantially uniform on an entire lateral surface of the semi-finished form (61).

It is evident that, owing to the continuous leaning that exists, during the entire phase of the variating of the semi-finished form, between the surface of the air bag 25 and the surface 61 (FIG. 9), coupled together, there takes place an exchange of uniform and constant pressures.

Owing to the extended zone of contact, these pressures can be, moreover, relatively small.

The apparatus described helps to realize the bead-core filling element complexes having various forms and dimensions.

As a matter of fact, it is possible to regulate the apparatus in the manner described, for utilizing said apparatus with bead-wire cores having dimensions (diameter and width) within a wide range of values and having a form that is diverse to that described.

Figures 8, 11:
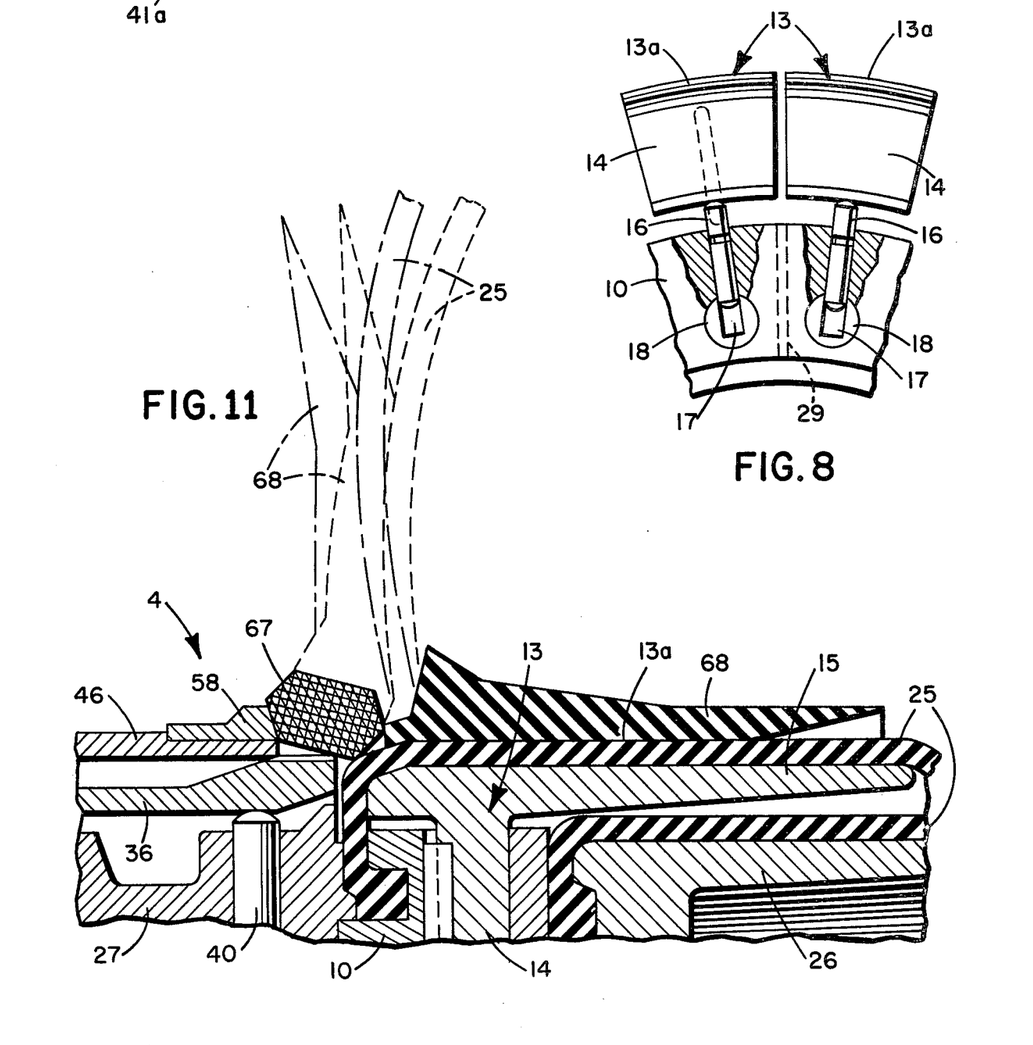
FIG. 11 represents a diagrammatical section of part of the drum and bell used for preparing a bead-wire core and annular filler element assembly, with a form different to that illustrated in the preceding figures.

It is sufficient to carry out the regulations described, and also changing the ring 58 of the bell 46. In FIG. 11, there is represented a part of a drum on which are mounted a bead-wire core 67 and a filling element 68 having a form that is diverse to the one previously mentioned. In particular, the bead-wire core 67, having a substantially hexagonal section, leans also against the conical surface of the ring 58.

In the same figure, there are indicated two diverse positions relative to the element 68 with respect to the bead-wire core 67, one of these being represented by a broken line and the other with a dot-and-dash line. Each of these positions has been obtained by varying the inclination of the basal surface of the semi-finished form 68 in the manner described previously.

It becomes evident that to these phases of the described process and to the structure of the apparatus, modifications and variations can be brought about without departing from what lies within the purview of the present invention.

What is claimed is:

1. An apparatus for preparing an assembly of an annular bead wire core for a tire bead and a tubular filler element, said core having a polygonal cross-section with a radially inwardly facing surface comprising:
   a substantially cylindrical supporting drum, said drum being adapted to be rotated by a motor;
   a motor for rotating said drum;
   a single inflatable air bag disposed along the circumference of said drum, said bag having an annular edge connected to one side of said drum, said tubular filler element being disposed about said bag, one end of said tubular filler element having at least two surfaces for mating with two surfaces of said bead wire core;
   a rotatable shaft;
   a cylindrical seat adjacent to and coaxial with said drum, said seat providing a support for the radially inwardly surface of said bead wire core;
   a bell carried on said rotatable shaft and shiftable thereon, said bell having a conical surface for pushing against a similarly shaped side surface of said core until an edge defined by two adjacent surfaces of said core contacts an end of the tubular element, thereby defining a wedge shaped space bounded by said end of said tubular element, said air bag, and one of said two adjacent surfaces defining said edge; and fluid means under pressure for inflating said air bag for enlarging the element increasingly from said one end thereby forcing said end of said tubular element into said space while said tubular member is being deformed into a substantially vertical annular shape, said two surfaces of said tubular filler element being brought into contact with mating surfaces on said bead wire core, thereby determining the final orientation of said filler element with respect to said bead core without the aid of an air bag restraining means for limiting the travel of said tubular element.

2. A process for preparing an assembly of a bead wire core and an annular filler element for the bead zone of a vehicle tire comprising:

supporting a strip of elastomeric material suited for forming said annular filler element on a substantially cylindrical supporting surface for obtaining a substantially tubular form, said tubular form having a first surface beginning at a first end extending inwardly towards a second end of said tubular form and then upwardly to the exterior surface of said tubular form forming a second surface for communicating with two surfaces of a bead core;

disposing a polygonal bead core having a surface comprising a plurality of adjacent planar surfaces on a substantially cylindrical seat adjacent to and coaxial with said first end of said tubular form;

positioning said bead core until an edge formed by two adjacent surfaces of said bead core is in communication with said first end of said tubular form below the beginning edge of said inwardly extending surface whereby a wedge shaped space is formed bounded by a surface of said bead core, said supporting surface, and said first end of said tubular form; and applying a force to the interior of said tubular form for forcing said second end of said tubular form into a vertical position above said first end and forcing the portion of said first end defining a boundary of said wedge shaped space into said space until said first and second surfaces of said first end communicate with two adjacent surfaces of said bead core thereby providing an annular form positioned in a predetermined relationship with said bead core without the aid of a positioning flange.

3. A process according to claim 2 wherein said force is applied to said tubular element by means of an air bag, said air bag being disposed along the inner surface of said tubular element with one end secured adjacent said first end of said tubular element, said air bag being pressurized with a fluid.

4. A process according to claim 3 wherein said tubular element is rotated around its axis during the application of a force to the interior surface of the tubular element.

5. The apparatus of claim 2 wherein said bell is rotated in a threaded groove of a crown fast with said shaft for regulating the correct axial position of said bell with respect to said drum.

6. The apparatus of claim 2 wherein said bell presents a joining head provided with a conical surface suited to coupling with a corresponding conical surface of the drum when the bell is shifted towards said drum thereby centering said bell with respect to said drum.

* * * * *

UNITED STATES PATENT AND TRADEMARK OFFICE
CERTIFICATE OF CORRECTION

PATENT NO. : 4,209,353
DATED : June 24, 1980
INVENTOR(S) : Bruno Colombani

It is certified that error appears in the above-identified patent and that said Letters Patent are hereby corrected as shown below:

The Assignee of this patent should be changed to read:

SOCIETA PNEUMATICI PIRELLI, S.p.A., Milan, Italy

Column 2, line 32, delete the first occurrence of "form".
Column 3, line 36, delete "the".
Column 4, line 24, after "ends" delete the comma ",".

IN THE CLAIMS:

Claim 5, line 1, delete "2" and insert therefor --1--.
Claim 6, line 1, delete "2" and insert therefor --1--.

Signed and Sealed this

Fourth Day of November 1980

[SEAL]

Attest:

SIDNEY A. DIAMOND

Attesting Officer

Commissioner of Patents and Trademarks